US010622633B2

(12) United States Patent
Oguro et al.

(10) Patent No.: US 10,622,633 B2
(45) Date of Patent: Apr. 14, 2020

(54) BINDER COMPOSITION FOR ALL-SOLID-STATE BATTERY

(71) Applicant: ZEON CORPORATION, Chiyoda-ku, Tokyo (JP)

(72) Inventors: Hiroki Oguro, Tokyo (JP); Kouichirou Maeda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 198 days.

(21) Appl. No.: 15/740,082

(22) PCT Filed: Aug. 31, 2016

(86) PCT No.: PCT/JP2016/075384
§ 371 (c)(1),
(2) Date: Dec. 27, 2017

(87) PCT Pub. No.: WO2017/043379
PCT Pub. Date: Mar. 16, 2017

(65) Prior Publication Data
US 2018/0198127 A1 Jul. 12, 2018

(30) Foreign Application Priority Data
Sep. 10, 2015 (JP) ................. 2015-178406

(51) Int. Cl.
*H01M 4/62* (2006.01)
*H01M 10/0562* (2010.01)
*H01M 4/58* (2010.01)

(52) U.S. Cl.
CPC ............. *H01M 4/623* (2013.01); *H01M 4/58* (2013.01); *H01M 4/62* (2013.01); *H01M 4/622* (2013.01); *H01M 10/0562* (2013.01); *H01M 2300/0082* (2013.01)

(58) Field of Classification Search
None
See application file for complete search history.

(56) References Cited

U.S. PATENT DOCUMENTS

| | | | | |
|---|---|---|---|---|
| 2012/0237821 A1* | 9/2012 | Mitsuhashi | ......... | H01M 4/0404 429/211 |
| 2013/0040206 A1 | 2/2013 | Yoshida et al. | | |
| 2013/0184385 A1* | 7/2013 | Ogihara | ................ | H01M 4/134 524/104 |
| 2013/0280459 A1 | 10/2013 | Nakashima et al. | | |
| 2015/0200399 A1* | 7/2015 | Yeou | ..................... | H01M 4/622 429/217 |
| 2016/0297955 A1 | 10/2016 | Inoue et al. | | |
| 2016/0322639 A1* | 11/2016 | Jeong | ................... | H01M 4/622 |
| 2018/0215906 A1 | 8/2018 | Sugawara et al. | | |

FOREIGN PATENT DOCUMENTS

| | | |
|---|---|---|
| EP | 3075776 A1 | 10/2016 |
| EP | 3333201 A1 | 6/2018 |
| JP | S59151770 A | 8/1984 |
| JP | 4134617 B2 | 8/2008 |
| JP | 2009176484 A | 8/2009 |
| JP | 2009211950 A | 9/2009 |
| WO | 2011105574 A1 | 9/2011 |

OTHER PUBLICATIONS

Nov. 29, 2016, International Search Report issued in the International Patent Application No. PCT/JP2016/075384.
Mar. 13, 2018, International Preliminary Report on Patentability issued in the International Patent Application No. PCT/JP2016/075384.
Mar. 25, 2019, the Extended European Search Report issued by the European Patent Office in the corresponding European Patent Application No. 16844240.8.

* cited by examiner

*Primary Examiner* — Alix E Eggerding
(74) *Attorney, Agent, or Firm* — Kenja IP Law PC

(57) ABSTRACT

The present invention includes: a copolymer including alkylene structure units and nitrile-group-containing monomer units; and a carbonate compound and/or an ester compound having a boiling point of 100° C. or higher and a molecular weight of 550 or less.

5 Claims, No Drawings

BINDER COMPOSITION FOR ALL-SOLID-STATE BATTERY

TECHNICAL FIELD

The present invention relates to a binder composition for an all-solid-state battery.

BACKGROUND ART

In recent years, demand for a battery such as a lithium ion battery has been increasing in a variety of applications such as a domestic small power storage device, an electric motorcycle, an electric vehicle, and a hybrid electric vehicle in addition to a portable terminal such as a portable information terminal or a portable electronic device.

With spread of the applications, further improvement of safety of the battery is required. In order to ensure safety, a method for preventing liquid leakage, and a method using a solid electrolyte in place of a combustible organic solvent electrolyte are useful.

As the solid electrolyte, a polymer solid electrolyte using polyethylene oxide or the like is known (Patent Literature 1). However, the polymer solid electrolyte is a combustible material. In addition, as the solid electrolyte, an inorganic solid electrolyte formed of an inorganic material has been also proposed (Patent Literature 2 or the like). An inorganic solid electrolyte is a solid electrolyte formed of an inorganic substance and is a non-combustible material as compared with a polymer solid electrolyte, and has very high safety as compared with an organic solvent electrolyte usually used. As described in Patent Literature 2, development of an all-solid-state battery with high safety using an inorganic solid electrolyte is progressing.

An all-solid-state battery includes an inorganic solid electrolyte layer as an electrolyte layer between a positive electrode and a negative electrode. Patent Literatures 3 and 4 describe an all-solid-state lithium secondary battery having a solid electrolyte layer formed by a method for applying a solid electrolyte layer slurry composition containing solid electrolyte particles and a solvent onto a positive electrode or a negative electrode and drying the composition (application method). In a case where an electrode or an electrolyte layer is formed by the application method, the viscosity or the fluidity of a slurry composition containing an active material or an electrolyte needs to be within a range of conditions making application possible. Meanwhile, it is important for an electrode and an electrolyte layer formed by applying a slurry composition and then drying a solvent to include an additive other than an active material and an electrolyte, such as a binder in order to exhibit characteristics as a battery. Therefore, Patent Literature 5 has proposed use of an acrylate-based polymer for a binder.

CITATION LIST

Patent Literature

Patent Literature 1: JP 4134617 B2
Patent Literature 2: JP 59-151770 A
Patent Literature 3: JP 2009-176484 A
Patent Literature 4: JP 2009-211950 A
Patent Literature 5: WO 2011/105574 A

SUMMARY OF INVENTION

Technical Problem

However, according to studies by the present inventors, all-solid-state lithium secondary batteries described in Patent Literatures 3 and 4 may have insufficient battery capacity characteristics or cycle characteristics due to insufficient ion conductivity in a solid electrolyte layer or an active material layer. In addition, Patent Literature 5 has proposed an all-solid-state secondary battery having excellent battery characteristics. However, a battery having higher characteristics is required.

An object of the present invention is to provide a binder composition for an all-solid-state battery capable of manufacturing an electrode having high flexibility and manufacturing an all-solid-state battery having excellent low temperature output characteristics.

Solution to Problem

The present inventors made intensive studies. As a result, the present inventors have found that the above object can be achieved by inclusion of a specific copolymer and a specific compound, and have completed the present invention.

That is, the present invention provides:

(1) a binder composition for an all-solid-state battery, including a copolymer containing an alkylene structural unit and a nitrile group-containing monomer unit and an ester compound and/or a carbonate compound having a boiling point of 100° C. or higher and a molecular weight of 550 or less;

(2) the binder composition for an all-solid-state battery according to (1), in which a content ratio of the nitrile group-containing monomer unit in the copolymer containing an alkylene structural unit and a nitrile group-containing monomer unit is 10% by mass or more and 55% by mass or less;

(3) the binder composition for an all-solid-state battery according to (1) or (2), in which the copolymer containing an alkylene structural unit and a nitrile group-containing monomer unit has an iodine value of 3 mg/100 mg or more and 30 mg/100 mg or less;

(4) the binder composition for an all-solid-state battery according to any one of (1) to (3), in which the ester compound is at least one selected from an adipate, a phosphate, a trimellitate, and a lactone; and (5) the binder composition for an all-solid-state battery according to any one of (1) to (3), in which the carbonate compound is a cyclic carbonate.

Advantageous Effects of Invention

The present invention can provide a binder composition for an all-solid-state battery, capable of manufacturing an electrode having high flexibility and manufacturing an all-solid-state battery having excellent low temperature output characteristics.

DESCRIPTION OF EMBODIMENTS

Hereinafter, a binder composition for an all-solid-state battery of the present invention will be described. The binder composition for an all-solid-state battery of the present invention contains a copolymer containing an alkylene structural unit and a nitrile group-containing monomer unit and an ester compound and/or a carbonate compound having a boiling point of 100° C. or higher and a molecular weight of 550 or less.

The copolymer used in the binder composition for an all-solid-state battery of the present invention contains an alkylene structural unit and a nitrile group-containing monomer unit.

(Copolymer)

Here, the copolymer needs to contain an alkylene structural unit and a nitrile group-containing monomer unit as a repeating unit, and optionally further contains a repeating unit other than the alkylene structural unit and the nitrile group-containing monomer unit (hereinafter, also referred to as "another repeating unit").

(Alkylene Structural Unit)

The alkylene structural unit is a repeating unit composed only of an alkylene structure represented by a general formula: —$C_nH_{2n}$— [in which n is an integer of 2 or more].

Here, the alkylene structural unit may be linear or branched, but the alkylene structural unit is preferably linear, that is, a linear alkylene structural unit. In addition, the number of carbon atoms of the alkylene structural unit is preferably 4 or more (that is, n in the above-described general formula is an integer of 4 or more).

A method for introducing the alkylene structural unit into the copolymer is not particularly limited. However, examples thereof include (1) a method for preparing a copolymer from a monomer composition containing a conjugated diene monomer, and adding hydrogen to the copolymer to convert a conjugated diene monomer unit into an alkylene structural unit, and (2) a method for preparing a copolymer from a monomer composition containing a 1-olefin monomer. Among these methods, the method (1) is preferable because the copolymer is easily manufactured.

Note that examples of the conjugated diene monomer include a conjugated diene compound having 4 or more carbon atoms, such as 1,3-butadiene, isoprene, 2,3-dimethyl-1,3-butadiene, or 1,3-pentadiene. Among these compounds, 1,3-butadiene is preferable. That is, the alkylene structural unit is preferably a structural unit obtained by hydrogenating a conjugated diene monomer unit (conjugated diene hydride unit), and more preferably a structural unit obtained by hydrogenating a 1,3-butadiene unit (1,3-butadiene hydride unit). Selective hydrogenation of the conjugated diene monomer unit can be performed using an aqueous layer hydrogenation method.

Examples of the 1-olefin monomer include ethylene, propylene, 1-butene, and 1-hexene.

These conjugated diene monomers and 1-olefin monomers can be used singly or in combination of two or more kinds thereof.

The content ratio of the alkylene structural unit in the copolymer is preferably 45% by mass or more and 90% by mass or less, more preferably 50% by mass or more and 80% by mass or less, and still more preferably 60% by mass or more and 75% by mass or less with respect to 100% by mass of all the repeating units (total of the structural unit and the monomer unit) in the copolymer.

(Nitrile Group-Containing Monomer Unit)

The nitrile group-containing monomer unit is a repeating unit derived from a nitrile group-containing monomer. The copolymer contains a nitrile group-containing monomer unit, and therefore can exhibit excellent flexibility and bonding force. Therefore, an all-solid-state battery manufactured using the binder composition for an all-solid-state battery of the present invention has excellent output characteristics and charge/discharge cycle characteristics.

Here, examples of the nitrile group-containing monomer capable of forming the nitrile group-containing monomer unit include an α,β-ethylenically unsaturated nitrile monomer. Specifically, the α,β-ethylenically unsaturated nitrile monomer is not particularly limited as long as being an α,β-ethylenically unsaturated compound having a nitrile group. However, examples thereof include acrylonitrile; an α-halogeno acrylonitrile such as α-chloro acrylonitrile or α-bromo acrylonitrile; and an α-alkyl acrylonitrile such as methacrylonitrile or α-ethyl acrylonitrile. Among these compounds, acrylonitrile and methacrylonitrile are preferable, and acrylonitrile is more preferable as the nitrile group-containing monomer from a viewpoint of enhancing binding force of the copolymer. These compounds can be used singly or in combination of two or more kinds thereof.

The content ratio of the nitrile group-containing monomer unit in the copolymer is preferably 10% by mass or more and 55% by mass or less, more preferably 20% by mass or more and 50% by mass or less, and still more preferably 25% by mass or more and 40% by mass or less with respect to 100% by mass of all the repeating units in the copolymer from viewpoints of appropriate affinity with a solid electrolyte and excellent dispersibility and binding property. The content ratio of the nitrile group-containing monomer unit in the copolymer within the above-described range can suppress a phenomenon that solubility in a solvent is insufficient because of a too high content ratio of the nitrile group-containing monomer unit, and can suppress a phenomenon that affinity with a solid electrolyte is insufficient because of a too low content ratio of the nitrile group-containing monomer unit.

(Other Repeating Unit)

The other repeating unit other than the above-described alkylene structural unit and nitrile group-containing monomer unit is not particularly limited, and examples thereof include a repeating unit derived from a known monomer copolymerizable with the above-described monomer, for example, a (meth)acrylate monomer unit and a hydrophilic group-containing monomer unit. Examples of the other repeating unit further include an aromatic vinyl monomer unit derived from an aromatic vinyl monomer, such as styrene, α-methylstyrene, butoxystyrene, or vinylnaphthalene.

Note that these monomers can be used singly or in combination of two or more kinds thereof. The term "(meth)acrylic" means acrylic and/or methacrylic in the present invention.

Here, examples of a (meth)acrylate monomer capable of forming the (meth)acrylate monomer unit include an alkyl acrylate such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, or stearyl acrylate; and an alkyl methacrylate such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, or stearyl methacrylate.

Examples of a hydrophilic group-containing monomer capable of forming the hydrophilic group-containing monomer unit include a polymerizable monomer having a hydrophilic group. Specific examples of the hydrophilic group-containing monomer include a monomer having a carboxylic acid group, a monomer having a sulfonic acid group, a monomer having a phosphoric acid group, and a monomer having a hydroxy group.

Examples of the monomer having a carboxylic acid group include a monocarboxylic acid, a dicarboxylic acid, acid anhydrides thereof, and derivatives thereof.

Examples of the monocarboxylic acid include acrylic acid, methacrylic acid, and crotonic acid.

Examples of the dicarboxylic acid include maleic acid, fumaric acid, and itaconic acid.

Examples of the dicarboxylic acid derivative include a polycarboxylate such as methyl maleic acid, dimethyl maleic acid, phenyl maleic acid, chloromaleic acid, dichloromaleic acid, fluoromaleic acid, methyl allyl maleate, diphenyl maleate, nonyl maleate, decyl maleate, dodecyl maleate, octadecyl maleate, fluoroalkyl maleate, monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, or dibutyl itaconate. Examples of the anhydride of the dicarboxylic acid include maleic anhydride, acrylic anhydride, methyl maleic anhydride, and dimethyl maleic anhydride.

Furthermore, as the monomer having a carboxylic acid group, an acid anhydride which forms a carboxyl group by hydrolysis can also be used.

Examples of the monomer having a sulfonic acid group include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid. Note that the term "(meth)allyl" means allyl and/or methallyl in the present invention.

Examples of the monomer having a phosphoric acid group include phosphoric acid-2-(meth)acryloyloxy ethyl, methyl phosphate-2-(meth)acryloyloxyethyl, and ethyl phosphate-(meth)acryloyloxyethyl. Note that the term "(meth)acryloyl" means acryloyl and/or methacryloyl in the present invention.

Examples of the monomer having a hydroxy group include an ethylenically unsaturated alcohol such as (meth)allyl alcohol, 3-buten-1-ol, or 5-hexen-1-ol; an alkanol ester of an ethylenically unsaturated carboxylic acid such as 2-hydroxy ethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, or di-2-hydroxypropyl itaconate; an ester of polyalkylene glycol and (meth)acrylic acid represented by a general formula $CH_2=CR^1—COO—(C_qH_{2q}O)_p—H$ (in the formula, p represents an integer of 2 to 9, q represents an integer of 2 to 4, and $R^1$ represents a hydrogen atom or a methyl group); a mono(meth)acrylate of a dihydroxy ester of a dicarboxylic acid, such as 2-hydroxyethyl-2'-(meth)acryloyloxy phthalate or 2-hydroxyethyl-2'-(meth)acryloyloxy succinate; a vinyl ether such as 2-hydroxyethyl vinyl ether or 2-hydroxypropyl vinyl ether; a mono(meth)allyl ether of alkylene glycol, such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, or (meth)allyl-6-hydroxyhexyl ether; a polyoxyalkylene glycol mono(meth)allyl ether such as diethylene glycol mono(meth)allyl ether or dipropylene glycol mono(meth)allyl ether; a mono(meth)allyl ether of a halogen and hydroxy-substituted (poly)alkylene glycol, such as glycerol mono(meth)allyl ether, (meth)allyl-2-chloro-3-hydroxypropyl ether, or (meth)allyl-2-hydroxy-3-chloropropyl ether; a mono(meth)allyl ether of a polyhydric phenol, such as eugenol or iso-eugenol, and a halogen-substituted product thereof; and a (meth)allyl thioether of alkylene glycol, such as (meth)allyl-2-hydroxyethyl thioether or (meth)allyl-2-hydroxy propyl thioether.

The content ratio of the other repeating unit in the copolymer is preferably 25% by mass or less, more preferably 10% by mass or less, and still more preferably 1% by mass or less. The copolymer particularly preferably contains no other repeating unit. That is, the copolymer is preferably composed only of an alkylene structural unit and a nitrile group-containing monomer unit.

The copolymer has an iodine value of preferably 3 mg/100 mg or more and 30 mg/100 mg or less, more preferably 5 mg/100 mg or more and 20 mg/100 mg or less from viewpoints of stable chemical structure of the copolymer at a high potential and capability of providing a battery having excellent battery characteristics. The iodine value of the copolymer within the above range can suppress a phenomenon that stability at an oxidation potential is insufficient because of a too high iodine value. Note that the iodine value can be determined in accordance with JIS K6235; 2006.

(Method for Preparing Copolymer)

Note that a method for preparing the above-described copolymer is not particularly limited, but for example, the copolymer can be obtained by polymerizing a monomer composition containing the above-described monomer. Furthermore, the polymerization may be performed in the presence of an optional chain transfer agent. Furthermore, the iodine value of the copolymer may be adjusted by hydrogenating (hydrogen-adding) the obtained copolymer.

Here, the content ratio of each monomer in the monomer composition used for preparation of the copolymer can be determined according to a content ratio of each repeating unit in the copolymer.

A polymerization mode is not particularly limited, and any one of a solution polymerization method, a suspension polymerization method, a bulk polymerization method, an emulsion polymerization method, and the like can be used. A polymerization reaction can be performed using any one of ion polymerization, radical polymerization, living radical polymerization, and the like.

A case where emulsion polymerization is performed as a polymerization mode will be described below.

Emulsion polymerization can be performed according to a usual method. In emulsion polymerization, a polymerization auxiliary material usually used, such as an emulsifier, a polymerization initiator, a molecular weight regulator, or a chain transfer agent can be used.

As the emulsifier, any emulsifier can be used as long as a desired polymer can be obtained, and examples thereof include an anionic surfactant, a nonionic surfactant, a cationic surfactant, and an amphoteric surfactant. Among these emulsifiers, an anionic surfactant such as an alkylbenzene sulfonate, an aliphatic sulfonate, a sulfate of a higher alcohol, an α-olefin sulfonate, or an alkyl ether sulfate can be preferably used.

Any amount of the emulsifier can be used as long as a desired polymer can be obtained. The amount is preferably 0.5 parts by mass or more, more preferably 1 part by mass or more, preferably 10 parts by mass or less, and more preferably 5 parts by mass or less with respect to 100 parts by mass of a monomer composition.

As the polymerization initiator used for a polymerization reaction, any polymerization initiator can be used as long as a desired polymer can be obtained. Examples thereof include sodium persulfate (NaPS), ammonium persulfate (APS), and potassium persulfate (KPS).

In polymerization, a polymerization system may include a molecular weight regulator or a chain transfer agent. Examples of the molecular weight regulator or the chain transfer agent include an alkyl mercaptan such as n-hexyl mercaptan, n-octyl mercaptan, t-octyl mercaptan, n-dodecyl mercaptan, t-dodecyl mercaptan, or n-stearyl mercaptan; a xanthogen compound such as dimethylxanthogen disulfide or diisopropylxanthogen disulfide; terpinolene; a thiuram compound such as tetramethyl thiuram disulfide, tetraethyl thiuram disulfide, or tetramethylthiuram monosulfide; a phenol compound such as 2,6-di-t-butyl-4-methyl phenol or styrenated phenol; an allyl compound such as allyl alcohol; a halogenated hydrocarbon compound such as dichloromethane, dibromomethane, or carbon tetrabromide; thioglycolic acid, thiomalic acid, 2-ethylhexyl thioglycolate, diphenylethylene, and α-methyl styrene dimer. Among these compounds, an alkyl mercaptan is preferable, and t-dodecyl mercaptan is more preferable from a viewpoint of suppressing a side reaction. These compounds may be used singly or in combination of two or more types thereof at any ratio.

In a case of using a chain transfer agent, the use amount of the chain transfer agent is preferably 0.1 parts by mass or more, more preferably 0.15 parts by mass or more, preferably 0.6 parts by mass or less, and more preferably 0.5 parts by mass or less with respect to 100 parts by mass of the total amount of monomers in a monomer composition.

Note that seed polymerization may be performed using seed particles in the polymerization. Polymerization conditions can also be arbitrarily selected depending on a polymerization method and the type of polymerization initiator.

Furthermore, a method for hydrogenating the copolymer is not particularly limited. However, for example, an aqueous layer hydrogenation method described in WO 2013/080989 A and JP 2013-8485 A is preferable, and an aqueous layer direct hydrogenation method is more preferable.

In the aqueous layer direct hydrogenation method, the concentration of an unsaturated polymer in an aqueous layer (concentration in a dispersion state) is preferably 40% by mass or less in order to prevent aggregation.

As a hydrogenation catalyst used is not particularly limited as long as being a compound which is hardly decomposed by water. Specific examples of the hydrogenation catalyst include, as a palladium catalyst, a palladium salt of a carboxylic acid such as formic acid, propionic acid, lauric acid, succinic acid, oleic acid, or phthalic acid; a palladium chlorinated compound such as palladium chloride, dichloro (cyclooctadiene) palladium, dichloro (norbornadiene) palladium, or ammonium hexachloropalladate (IV); an iodized compound such as palladium iodide; and palladium sulfate.dihydrate. Among these compounds, a palladium salt of a carboxylic acid, dichloro (norbornadiene) palladium, and ammonium hexachloropalladate (IV) are particularly preferable. The use amount of the hydrogenation catalyst is only required to be determined appropriately, but is preferably 5 to 6000 ppm, and more preferably 10 to 4000 ppm in terms of the metal amount of the hydrogenation catalyst with respect to the amount of an unsaturated polymer to be hydrogenated.

The reaction temperature in the aqueous layer direct hydrogenation method is preferably 0 to 300° C., more preferably 20 to 150° C., and particularly preferably 30 to 100° C. The reaction temperature within the above range can suppress a phenomenon that a reaction rate decreases because of a too low reaction temperature, and can suppress a phenomenon that a side reaction such as a hydrogen addition reaction of a nitrile group occurs because of a too high reaction temperature. A hydrogen pressure is preferably 0.1 to 30 MPa, and more preferably 0.5 to 20 MPa. Reaction time is selected considering a reaction temperature, a hydrogen pressure, a target hydrogenation ratio (iodine value), and the like.

In the aqueous layer direct hydrogenation method, after completion of the reaction, a hydrogenation catalyst in a dispersion is removed. As a method therefor, for example, it is possible to adopt a method for adding an adsorbent such as activated carbon or an ion exchange resin, causing the adsorbent to adsorb a hydrogenation catalyst under stirring, and then filtering or centrifuging the dispersion.

(Ester Compound and/or Carbonate Compound)

The binder composition for an all-solid-state battery of the present invention contains an ester compound and/or a carbonate compound having a boiling point of 100° C. or higher and a molecular weight of 550 or less. These compounds function as a plasticizer.

Each of these compounds has a boiling point of 100° C. or higher, preferably 120° C. or higher, more preferably 150° C. or higher from a viewpoint of capability of uniform presence of these compounds in the copolymer. A too low boiling point easily causes volatilization at the time of manufacturing a battery. Here, the above-described boiling point is at normal pressure. The molecular weight of each of these compounds is 550 or less, preferably 500 or less, and more preferably 450 or less from a viewpoint of excellent affinity with the copolymer. A too large molecular weight makes the affinity with the copolymer insufficient.

The addition amount of these compounds is preferably 0.1 to 5 parts, more preferably 0.5 to 4 parts, and still more preferably 1 to 3 parts with respect to 100 parts of the solid content of the copolymer from a viewpoint of an excellent balance between imparting flexibility of an electrode body and improvement of low temperature output characteristics of a battery. The addition amount of these compounds within the above range can suppress a phenomenon that these compounds act as a resistance component because of a too large addition amount to deteriorate battery characteristics. Furthermore, the addition amount of these compounds within the above range can suppress a phenomenon that an effect is not sufficiently exhibited because of a too small addition amount.

Examples of the ester compound and/or carbonate compound which can be used in the binder composition for an all-solid-state battery of the present invention include a phthalate, an adipate, a trimellitate, a phosphate, a citrate, a sebacate, an azelate, a maleate, a benzoate, a lactone, a chain carbonate, and a cyclic carbonate. An adipate, a phosphate, a trimellitate, a lactone, and a cyclic carbonate are preferable. These compounds can be used singly or in combination of two or more kinds thereof.

Specific examples of the ester compound include a phthalate such as bis(2-ethylhexyl) phthalate, dibutyl phthalate, butyl benzyl phthalate, diisononyl phthalate, diisodecyl phthalate, or di-n-octyl phthalate; an adipate such as bis(2-ethylhexyl) adipate, diisodecyl adipate, or diisononyl adipate; a trimellitate such as tributyl trimellitate or tris(2-ethylhexyl) trimellitate; a phosphate such as triamyl phosphate, tributyl phosphate, tris(2-chloroethyl) phosphate, tris(1,3-dichloro-2-propyl) phosphate, triethyl phosphate, trimethyl phosphate, triphenyl phosphate, tris(2-butoxyethyl) phosphate, diphenyl 2-ethylhexyl phosphate, tris(2-ethylhexyl) phosphate, or tri-o-cresyl phosphate; a citrate such as tributyl citrate, triethyl citrate, trimethyl citrate, or tripropyl citrate; a sebacate such as dibutyl sebacate, diethyl sebacate, bis(2-ethylhexyl) sebacate, dimethyl sebacate, or di-n-octyl sebacate; an azelate such as bis(2-ethylhexyl) azelate or dimethyl azelate; a maleate such as dibutyl maleate, diethyl maleate, bis(2-ethylhexyl) maleate, or dimethyl maleate; a benzoate such as diethylene glycol dibenzoate; and a lactone such as gamma butyrolactone, gamma valerolactone, or delta valerolactone.

Specific examples of the carbonate compound include a linear carbonate such as ethylmethyl carbonate or diethyl carbonate; and a cyclic carbonate such as ethylene carbonate, propylene carbonate, or butylene carbonate.

(Binder Composition for all-Solid-State Battery)

The binder composition for an all-solid-state battery of the present invention is preferably obtained by solvent exchange of an aqueous dispersion of a copolymer containing an alkylene structural unit and a nitrile group-containing monomer unit together with the above-described ester compound and/or carbonate compound. For example, the binder composition for an all-solid-state battery of the present invention can be obtained by solvent exchange of an aqueous dispersion of a copolymer containing an alkylene structural unit and a nitrile group-containing monomer unit, obtained by the above-described aqueous layer direct hydrogenation method together with the above-described ester compound and/or carbonate compound. Here, the solvent exchange can be performed by a known method. For example, the above-described aqueous dispersion, the ester compound and/or the carbonate compound, and an organic solvent are put in a rotary evaporator, and the solvent exchange and dehydration operation can be performed at a predetermined temperature under reduced pressure.

By using the binder composition for an all-solid-state battery of the present invention, flexibility of an electrode is enhanced and process compatibility is improved. In addition, by using the binder composition for an all-solid-state battery of the present invention, a contact area between solid electrolytes increases and internal resistance decreases, and therefore low temperature output characteristics of an obtained battery are improved.

(Organic Solvent)

Preferable examples of the organic solvent which can be used for the solvent exchange include a cycloaliphatic hydrocarbon such as cyclopentane or cyclohexane; an aromatic hydrocarbon such as toluene or xylene; an ether such as dimethyl ether, methyl ethyl ether, diethyl ether, or cyclopentyl methyl ether; and an ester such as ethyl acetate or butyl acetate. More preferable examples thereof include toluene and xylene. Note that these solvents can be used singly or in mixture of two or more kinds thereof.

(All-Solid-State Battery)

By using the binder composition for an all-solid-state battery of the present invention as a binder in at least one layer, preferably all layers of at least a positive electrode active material layer, a negative electrode active material layer, and a solid electrolyte layer, an all-solid-state battery including a positive electrode having the positive electrode active material layer, a negative electrode having the negative electrode active material layer, and a solid electrolyte layer disposed between these positive and negative electrode active material layers is obtained. The positive electrode has the positive electrode active material layer on a current collector, and the negative electrode has the negative electrode active material layer on a current collector. Hereinafter, the solid electrolyte layer, the positive electrode active material layer, and the negative electrode active material layer will be described.

(Solid Electrolyte Layer)

The solid electrolyte layer is formed by applying a solid electrolyte layer slurry composition containing solid electrolyte particles and a binder for a solid electrolyte layer onto a positive electrode active material layer or a negative electrode active material layer described below, and drying the composition. The solid electrolyte layer slurry composition is manufactured by mixing solid electrolyte particles, a binder for a solid electrolyte layer, an organic solvent, and other components added as necessary.

(Solid Electrolyte Particles)

A solid electrolyte which has been ground is used. Therefore, the solid electrolyte is particulate, but is not perfectly spherical but unshaped. In general, the size of a fine particle is measured by a method for measuring scattered light by irradiating a particle with a laser beam, for example. However, the particle diameter in this case is a value obtained by assuming that the shape of one particle is spherical. In a case where a plurality of particles is measured together, a presence ratio of particles having a corresponding particle diameter can be indicated as a particle size distribution. Solid electrolyte particles to form a solid electrolyte layer are often indicated by a value measured by this method as an average particle diameter.

The average particle diameter of the solid electrolyte particles is preferably 0.3 to 1.3 μm from a viewpoint of being able to obtain a solid electrolyte layer slurry composition having excellent dispersibility and coatability. Note that the average particle diameter of the solid electrolyte particles is a number average particle diameter which can be determined by measuring a particle size distribution by laser diffraction.

The solid electrolyte particles are not particularly limited as long as having conductivity of a lithium ion, but preferably contain a crystalline inorganic lithium ion conductor or an amorphous inorganic lithium ion conductor.

Examples of the crystalline inorganic lithium ion conductor include $Li_3N$, LISICON($Li_{14}Zn(GeO_4)_4$), perovskite type $Li_{0.5}La_{0.5}TiO_3$, LIPON($Li_{3+y}PO_{4-x}N_x$), and Thio-LISICON($Li_{3.25}Ge_{0.25}P_{0.75}S_4$).

The amorphous inorganic lithium ion conductor is not particularly limited as long as containing S (sulfur atom) and having ion conductivity (sulfide solid electrolyte material). Here, in a case where an all-solid-state battery using the binder for an all-solid-state battery of the present invention is an all-solid-state lithium secondary battery, examples of a sulfide solid electrolyte material used include a material formed using a raw material composition containing $Li_2S$ and a sulfide of an element belonging to groups 13 to 15. Examples of a method for synthesizing a sulfide solid electrolyte material using such a raw material composition include an amorphization method. Examples of the amorphization method include a mechanical milling method and a melt quenching method, and the mechanical milling method is particularly preferable. This is because the mechanical milling method makes it possible to perform a treatment at normal temperature and to simplify a manufacturing process.

Examples of the above-described element belonging to groups 13 to 15 include Al, Si, Ge, P, As, and Sb. Specific examples of a sulfide of an element belonging to groups 13 to 15 include $Al_2S_3$, $SiS_2$, $GeS_2$, $P_2S_3$, $P_2S_5$, $As_2S_3$, and $Sb_2S_3$. Among these sulfides, a sulfide of group 14 or 15 is preferably used. Particularly, a sulfide solid electrolyte material formed using a raw material composition containing $Li_2S$ and a sulfide of an element belonging to groups 13 to 15 is preferably a $Li_2S$—$P_2S_5$ material, a $Li_2S$—$SiS_2$ material, a $Li_2S$—$GeS_2$ material, or a $Li_2S$—$Al_2S_3$ material, and more preferably a $Li_2S$—$P_2S_5$ material. This is because these materials have excellent Li ion conductivity.

In addition, the sulfide solid electrolyte material preferably contains crosslinking sulfur. This is because inclusion of crosslinking sulfur increases ion conductivity. Furthermore, in a case where the sulfide solid electrolyte material contains crosslinking sulfur, usually, reactivity with a positive electrode active material is high, and a high resistance layer is easily generated. However, the present invention uses a binder composition containing a complex of a fluorine-based polymer and a copolymer containing an alkylene structural unit and a nitrile group-containing monomer unit, and therefore can sufficiently exhibit an effect of the invention that generation of a high resistance layer can be suppressed. Note that "inclusion of crosslinking sulfur" can be determined, for example, by considering a measurement result of a Raman spectrum, a raw material composition ratio, and a measurement result of NMR.

The molar fraction of $Li_2S$ in a $Li_2S$—$P_2S_5$ material or a $Li_2S$—$Al_2S_3$ material is, for example, within a range of 50 to 74%, preferably within a range of 60 to 74% from a viewpoint of being able to obtain a sulfide solid electrolyte material containing crosslinking sulfur more surely.

The sulfide solid electrolyte material may be sulfide glass or crystallized sulfide glass obtained by subjecting the sulfide glass to a heat treatment. The sulfide glass can be obtained by the above-described amorphization method, for example. The crystallized sulfide glass can be obtained by subjecting sulfide glass to a heat treatment, for example.

Particularly, the sulfide solid electrolyte material is preferably crystallized sulfide glass represented by $Li_7P_3S_{11}$. This is because the crystallized sulfide glass represented by $Li_7P_3S_{11}$ has particularly excellent Li ion conductivity. As a method for synthesizing $Li_7P_3S_{11}$, for example, $Li_2S$ and $P_2S_5$ are mixed at a molar ratio of 70:30, are amorphized with a ball mill to synthesize sulfide glass, and the obtained sulfide glass is subjected to a heat treatment at 150° C. to 360° C. to synthesize $Li_7P_3S_{11}$.

(Binder for Solid Electrolyte Layer)

The binder for a solid electrolyte layer is used for binding solid electrolyte particles to form a solid electrolyte layer. As the binder for a solid electrolyte layer, a binder composition for an all-solid-state battery including a copolymer containing an alkylene structural unit and a nitrile group-containing monomer unit and an ester compound and/or a carbonate compound having a boiling point of 100° C. or higher and a molecular weight of 550 or less is preferably used.

(Organic Solvent)

As the organic solvent, those exemplified in the above-described binder composition for an all-solid-state battery can be used.

The solid electrolyte layer slurry composition may contain a component having functions of a dispersing agent, a leveling agent, and a defoaming agent as other components added as necessary in addition to the above-described components. The component is not particularly limited as long as having no influence on a battery reaction.

(Dispersing Agent)

Examples of the dispersing agent include an anionic compound, a cationic compound, a nonionic compound, and a polymer compound. The dispersing agent is selected depending on solid electrolyte particles used. The content of the dispersing agent in the solid electrolyte layer slurry composition is preferably within a range having no influence on battery characteristics, and is specifically 10 parts by mass or less with respect to 100 parts by mass of the solid electrolyte particles.

(Leveling Agent)

Examples of the leveling agent include a surfactant such as an alkyl-based surfactant, a silicone-based surfactant, a fluorine-based surfactant, or a metal-based surfactant. By mixing the above-described surfactant, it is possible to prevent repelling which occurs when the solid electrolyte layer slurry composition is applied onto a surface of a positive electrode active material layer or a negative electrode active material layer described below, and to improve smoothness of positive and negative electrodes. The content of the leveling agent in the solid electrolyte layer slurry composition is preferably within a range having no influence on battery characteristics, and is specifically 10 parts by mass or less with respect to 100 parts by mass of the solid electrolyte particles.

(Defoaming Agent)

Examples of the defoaming agent include a mineral oil-based defoaming agent, a silicone-based defoaming agent, and a polymer-based defoaming agent. The defoaming agent is selected depending on solid electrolyte particles used. The content of the defoaming agent in the solid electrolyte layer slurry composition is preferably within a range having no influence on battery characteristics, and is specifically 10 parts by mass or less with respect to 100 parts by mass of the solid electrolyte particles.

(Positive Electrode Active Material Layer)

The positive electrode active material layer is formed by applying a positive electrode active material layer slurry composition containing a positive electrode active material, solid electrolyte particles, and a binder for a positive electrode onto a surface of a current collector described below, and drying the composition. The positive electrode active material layer slurry composition is manufactured by mixing a positive electrode active material, solid electrolyte particles, a binder for a positive electrode, an organic solvent, and other components added as necessary.

(Positive Electrode Active Material)

The positive electrode active material is a compound capable of occluding and releasing a lithium ion. The positive electrode active material is roughly classified into a material formed of an inorganic compound and a material formed of an organic compound.

Examples of the positive electrode active material formed of an inorganic compound include a transition metal oxide, a composite oxide of lithium and a transition metal, and a transition metal sulfide. Examples of the above-described transition metal include Fe, Co, Ni, and Mn. Specific examples of the inorganic compound used for the positive electrode active material include a lithium-containing composite metal oxide such as $LiCoO_2$, $LiNiO_2$, $LiMnO_2$, $LiMn_2O_4$, $LiFePO_4$, or $LiFeVO_4$; a transition metal sulfide such as $TiS_2$, $TiS_3$, or amorphous $MoS_2$; and a transition metal oxide such as $Cu_2V_2O_3$, amorphous $V_2O$—$P_2O_5$, $MoO_3$, $V_2O_5$, or $V_6O_{13}$. These compounds may have been subjected to partial element substitution.

Examples of the positive electrode active material formed of an organic compound include polyaniline, polypyrrole, polyacene, a disulfide-based compound, a polysulfide-based compound, and an N-fluoro pyridinium salt. The positive electrode active material may be a mixture of the above-described inorganic compound and organic compound.

The average particle diameter of the positive electrode active material used in the present invention is usually 0.1 to 50 μm, and preferably 1 to 20 μm from viewpoints of improving battery characteristics such as load characteristics or charge/discharge cycle characteristics, being able to obtain an all-solid-state secondary battery having large charge/discharge capacity, easy handling of a positive electrode active material layer slurry composition, and easy handling in manufacturing a positive electrode. The average particle diameter can be determined by measuring a particle size distribution by laser diffraction.

(Solid Electrolyte Particles)

As the solid electrolyte particles, those exemplified in the solid electrolyte layer can be used.

A weight ratio between the positive electrode active material and the solid electrolyte particles (positive electrode active material:solid electrolyte particles) is preferably 90:10 to 50:50, and more preferably 60:40 to 80:20. The weight ratio of the positive electrode active material within this range can suppress a phenomenon that the amount of the positive electrode active material in a battery is reduced because of a too small weight ratio of the positive electrode active material, leading to capacity reduction as a battery. Furthermore, the weight ratio of the solid electrolyte particles within this range can suppress a phenomenon that conductivity cannot be sufficiently obtained and the positive electrode active material cannot be used effectively because of a too small weight ratio of the solid electrolyte particles, leading to capacity reduction as a battery.

(Binder for Positive Electrode)

The binder for a positive electrode is not particularly limited. However, a binder composition for an all-solid-state battery including a copolymer containing an alkylene structural unit and a nitrile group-containing monomer unit and an ester compound and/or a carbonate compound having a boiling point of 100° C. or higher and a molecular weight of 550 or less is preferably used.

The content of the binder for a positive electrode in the positive electrode active material layer slurry composition is preferably 0.1 to 5 parts by mass, and more preferably 0.2 to 4 parts by mass in terms of a solid content with respect to 100 parts by mass of the positive electrode active material from a viewpoint of being able to prevent the positive electrode active material from falling from an electrode without inhibiting a battery reaction.

As the organic solvent and other components added as necessary in the positive electrode active material layer slurry composition, similar compounds to those exemplified in the above solid electrolyte layer can be used. The content of the organic solvent in the positive electrode active material layer slurry composition is preferably 20 to 80 parts by mass, and more preferably 30 to 70 parts by mass with respect to 100 parts by mass of the positive electrode active material from a viewpoint of being able to obtain an excellent coating characteristic while maintaining dispersibility of a solid electrolyte.

The positive electrode active material layer slurry composition may contain an additive exhibiting various functions, such as a conductive agent or a reinforcing material as other components added as necessary in addition to the above-described components. The additive is not particularly limited as long as having no influence on a battery reaction.

(Conductive Agent)

The conductive agent is not particularly limited as long as being able to impart conductivity, but usual examples thereof include carbon powder such as acetylene black, carbon black, or graphite, and fibers and foils of various metals.

(Reinforcing Material)

As the reinforcing material, various inorganic and organic spherical, plate-shaped, rod-shaped, or fibrous fillers can be used.

(Negative electrode active material layer) The negative electrode active material layer contains a negative electrode active material.

(Negative Electrode Active Material)

Examples of the negative electrode active material include an allotrope of carbon, such as graphite or coke. The negative electrode active material formed of the above-described allotrope of carbon can be also used in a form of a mixture with a metal, a metal salt, an oxide, or the like, or a cover material. Further, as the negative electrode active material, an oxide and a sulfate of silicon, tin, zinc, manganese, iron, or nickel, metallic lithium, a lithium alloy such as Li—Al, Li—Bi—Cd, or Li—Sn—Cd, a lithium transition metal nitride, and silicon can be used. In a case of a metal material, a metal foil or a metal plate can be used as an electrode as it is, but the metal material may be used in a form of particles.

In this case, the negative electrode active material layer is formed by applying a negative electrode active material layer slurry composition containing a negative electrode active material, solid electrolyte particles, and a binder for a negative electrode onto a surface of a current collector described below, and drying the composition. The negative electrode active material layer slurry composition is manufactured by mixing a negative electrode active material, solid electrolyte particles, a binder for a negative electrode, an organic solvent, and other components added as necessary. Note that as the solid electrolyte particles, the organic solvent, and other components added as necessary in the negative electrode active material layer slurry composition, similar compounds to those exemplified in the above-described positive electrode active material layer can be used.

In a case where the negative electrode active material is in a form of particles, the average particle diameter of the negative electrode active material is usually 1 to 50 µm, and preferably 15 to 30 µm from a viewpoint of improving battery characteristics such as an initial efficiency, load characteristics, or charge/discharge cycle characteristics.

A weight ratio between the negative electrode active material and the solid electrolyte particles (negative electrode active material:solid electrolyte particles) is preferably 90:10 to 50:50, and more preferably 60:40 to 80:20. The weight ratio of the negative electrode active material within this range can suppress a phenomenon that the amount of the negative electrode active material in a battery is reduced because of a too small weight ratio of the negative electrode active material, leading to capacity reduction as a battery. Furthermore, the weight ratio of the solid electrolyte particles within this range can suppress a phenomenon that conductivity cannot be sufficiently obtained and the negative electrode active material cannot be used effectively because of a too small weight ratio of the solid electrolyte particles, leading to capacity reduction as a battery.

(Binder for Negative Electrode)

The binder for a negative electrode is not particularly limited. However, a binder composition for an all-solid-state battery including a copolymer containing an alkylene structural unit and a nitrile group-containing monomer unit and an ester compound and/or a carbonate compound having a boiling point of 100° C. or higher and a molecular weight of 550 or less is preferably used.

In a case where the negative electrode active material is in a form of particles, the content of the binder for a negative electrode in the negative electrode active material layer slurry composition is preferably 0.1 to 5 parts by mass, and more preferably 0.2 to 4 parts by mass in terms of a solid content with respect to 100 parts by mass of the negative electrode active material from a viewpoint of preventing the electrode active material from falling from an electrode without inhibiting a battery reaction.

(Current Collector)

The current collector used for forming the positive electrode active material layer or the negative electrode active material layer is not particularly limited as long as being a material having electrical conductivity and electrochemical durability. However, for example, a metal material such as iron, copper, aluminum, nickel, stainless steel, titanium, tantalum, gold, or platinum is preferable from a viewpoint of heat resistance. Among the materials, aluminum is particularly preferable as a positive electrode, and copper is particularly preferable as a negative electrode. The shape of the current collector is not particularly limited, but a sheet-shaped current collector having a thickness of about 0.001 to 0.5 mm is preferable. The current collector is preferably subjected to a roughening treatment in advance to be used in order to enhance a bonding strength between the above-described positive and negative electrode active material layers. Examples of a roughening method include a mechanical polishing method, an electrolytic polishing method, and a chemical polishing method. In the mechanical polishing method, abrasive cloth and paper to which abrasive grains have been fixed, a grindstone, an emery wheel, a wire brush provided with a steel wire or the like, and the like are used. In addition, in order to enhance a bonding strength and conductivity between the current collector and the positive and negative electrode active material layers, an intermediate layer may be formed on a surface of the current collector.

(Manufacture of Solid Electrolyte Layer Slurry Composition)

The solid electrolyte layer slurry composition is obtained by mixing the above-described solid electrolyte particles, binder for a solid electrolyte layer, organic solvent, and other components added as necessary.

(Manufacture of Positive Electrode Active Material Layer Slurry Composition)

The positive electrode active material layer slurry composition is obtained by mixing the above-described positive electrode active material, solid electrolyte particles, binder for a positive electrode, organic solvent, and other components added as necessary.

(Manufacture of Negative Electrode Active Material Layer Slurry Composition)

The negative electrode active material layer slurry composition is obtained by mixing the above-described negative electrode active material, solid electrolyte particles, binder for a negative electrode, organic solvent, and other components added as necessary.

A method for mixing the above slurry composition is not particularly limited. However, examples thereof include a method using a mixing apparatus such as a stirring type apparatus, a shaking type apparatus, or a rotary type apparatus. Examples thereof further include a method using a dispersion kneading apparatus such as a homogenizer, a ball mill, a bead mill, a planetary mixer, a sand mill, a roll mill, or a planetary kneader. A method using a planetary mixer, a ball mill, or a bead mill is preferable from a viewpoint of being able to suppress aggregation of the solid electrolyte particles.

(Manufacture of all-Solid-State Battery)

A positive electrode in an all-solid-state battery is manufactured by forming a positive electrode active material layer by applying the above-described positive electrode active material layer slurry composition onto a current collector, and drying the composition. In a case where a metal foil is used as a negative electrode in the all-solid-state battery, the metal foil can be used as it is. In a case where a negative electrode active material is in a form of particles, the negative electrode is manufactured by forming a negative electrode active material layer by applying the above-described negative electrode active material layer slurry composition onto a current collector different from the current collector of the positive electrode, and drying the composition. Subsequently, a solid electrolyte layer slurry composition is applied onto the formed positive electrode active material layer or negative electrode active material layer, and the composition is dried to form a solid electrolyte layer. Then, by bonding an electrode in which the solid electrolyte layer has not been formed to the above-described electrode in which the solid electrolyte layer has been formed, an all-solid-state battery element is manufactured.

A method for applying a positive electrode active material layer slurry composition and a negative electrode active material layer slurry composition onto a current collector is not particularly limited, but examples thereof include a doctor blade method, a dip method, a reverse roll method, a direct roll method, a gravure method, an extrusion method, and a brush application method. The application amount is not particularly limited, but is such an amount that the thickness of an active material layer formed after an organic solvent is removed is usually 5 to 300 µm, and preferably 10 to 250 µm. A drying method is not particularly limited, but examples thereof include drying with warm air, hot air, or low humidity air, vacuum drying, and drying by irradiation with a (far) infrared ray or an electron beam. A drying condition is usually adjusted such that an organic solvent volatilizes as soon as possible within a speed range which does not cause cracking in an active material layer due to stress concentration and does not cause an active material layer to peel from a current collector. Furthermore, the dried electrode may be pressed to be stabilized. Examples of a press method include a mold press method and a calender press method, but are not limited thereto.

Drying is performed at a temperature at which an organic solvent volatilizes sufficiently. Specifically, the drying temperature is preferably 50 to 250° C., and more preferably 80 to 200° C. from a viewpoint of being able to form an excellent active material layer without causing thermal decomposition of binders for positive and negative electrodes. Drying time is not particularly limited, but drying is usually performed within a range of 10 to 60 minutes.

A method for applying a solid electrolyte layer slurry composition onto a positive electrode active material layer or a negative electrode active material layer is not particularly limited, but a method similar to the above-described method for applying a positive electrode active material layer slurry composition and a negative electrode active material layer slurry composition onto a current collector is used. However, a gravure method is preferable from a viewpoint of being able to form a thin film solid electrolyte layer. The application amount is not particularly limited, but is such an amount that the thickness of a solid electrolyte layer formed after an organic solvent is removed is usually 2 to 20 µm, and preferably 3 to 15 µm. A drying method, a drying condition, and a drying temperature are also similar to those for the above-described positive electrode active material layer slurry composition and negative electrode active material layer slurry composition.

Furthermore, the above-described laminate obtained by bonding an electrode in which a solid electrolyte layer has been formed to an electrode in which a solid electrolyte layer has not been formed may be pressurized. A pressurizing method is not particularly limited, but examples thereof include flat plate press, roll press, and cold isostatic press (CIP). The pressure for pressure press is preferably 5 to 700 MPa, and more preferably 7 to 500 MPa from a viewpoint of exhibiting excellent battery characteristics due to a low resistance at an interface between an electrode and a solid electrolyte layer, and a low contact resistance between particles in each layer.

It is not particularly limited whether a solid electrolyte layer slurry composition is applied onto a positive electrode active material layer or a negative electrode active material layer. However, the solid electrolyte layer slurry composition is preferably applied onto an active material layer having a larger particle diameter of an electrode active material to be used. When the particle diameter of an electrode active material is large, unevenness is formed on a surface of an active material layer. Therefore, by applying the slurry composition thereonto, the unevenness on the surface of the active material layer can be relieved. Accordingly, when lamination is performed by bonding an electrode in which a solid electrolyte layer has been formed to an electrode in which a solid electrolyte layer has not been formed, a contact area between the solid electrolyte layer and an electrode is increased, and an interface resistance can be suppressed.

The resulting all-solid-state battery device is left as it is, is wound, is bent, or the like in accordance with a battery shape, is put in a battery container, and is sealed to obtain an all-solid-state battery. An expand metal, an overcurrent prevention device such as a fuse or a PTC device, a lead plate, or the like is put in the battery container as necessary, and an increase in pressure in the battery and overcharge/overdischarge can be prevented. The shape of a battery may be any one of a coin type, a button type, a sheet type, a cylinder type, a rectangular shape, and a flat type.

EXAMPLES

Hereinafter, the present invention will be described with reference to Examples, but the present invention is not limited in any way by these Examples. Characteristics are evaluated by the following methods. Note that "part" and "%" in these Examples mean "part by mass" and "% by mass", respectively, unless otherwise particularly specified.
<Measurement of Iodine Value>
An iodine value was determined according to JIS K 6235 (2006).
<Flexibility of Electrode Body>
On a solid electrolyte layer side of the prepared positive electrode for an all-solid-state secondary battery with a solid electrolyte layer, rods with different diameters were placed along a width direction (short side direction) of the positive electrode. Then, a laminate was wound around a rod to evaluate whether the solid electrolyte layer was cracked. As the diameter of a rod in which cracking of a solid electrolyte layer is observed is smaller, higher flexibility of an electrode body and better processability are indicated.
A: not broken with a rod having a diameter of 0.8 mm or more
B: not broken with a rod having a diameter of 1.0 mm or more
C: not broken with a rod having a diameter of 1.2 mm or more
D: not broken with a rod having a diameter of 1.4 mm or more <Battery Characteristics: Low Temperature Output Characteristics>
The prepared all-solid-state secondary battery was charged at a constant current and a constant voltage (CCCV) to 4.3 V in an atmosphere of temperature 25° C. to prepare a cell. The prepared cell was discharged to 3.0 V by a constant current method of 1 C under an atmosphere of each of temperature 25° C. and temperature −10° C. to determine electric capacity at each temperature. Then, a discharge capacity retention ratio represented by a ratio of electric capacity (=(electric capacity at temperature −10° C./electric capacity at temperature 25° C.)×100(%)) was determined. These measurements were performed for five cells of all-solid-state secondary batteries, and an average value of the discharge capacity retention ratios of these cells was evaluated as low temperature output characteristic according to the following criteria. A larger value of the ratio indicates better low temperature output characteristics.
A: Capacity retention ratio is 70% or more.
B: Capacity retention ratio is 60% or more and less than 70%.
C: Capacity retention ratio is 50% or more and less than 60%.
D: Capacity retention ratio is less than 50%.

Example 1

<Preparation of Copolymer Containing Alkylene Structural Unit and Nitrile Group-Containing Monomer Unit>
In an autoclave equipped with a stirrer, 240 parts of ion exchanged water, 2.5 parts of sodium alkylbenzenesulfonate as an emulsifier, 35 parts of acrylonitrile as a nitrile group-containing monomer, and 0.25 part of t-dodecylmercaptan as a chain transfer agent were put in this order, and an inside thereof was replaced with nitrogen. Thereafter, 65 parts of 1,3-butadiene as a conjugated diene monomer was injected under pressure, 0.25 parts of ammonium persulfate as a polymerization initiator was added, and the resulting mixture was subjected to a polymerization reaction at a reaction temperature of 40° C. As a result, a copolymer of acrylonitrile and 1,3-butadiene was obtained. Note that a polymerization conversion rate was 85%.

Ion exchanged water was added to the obtained copolymer to obtain a solution in which the total solid content concentration was adjusted to 12% by mass. In an autoclave having a volume of 1 L and equipped with a stirrer, 400 mL (total solid content: 48 g) of the obtained solution was put. Nitrogen gas was allowed to flow therethrough for 10 minutes to remove dissolved oxygen in the solution. Thereafter, 75 mg of palladium acetate as a hydrogenation reaction catalyst was dissolved in 180 mL of ion exchanged water to which fourfold molar amount of nitric acid with respect to palladium (Pd) had been added, and the resulting solution was added. The inside of the system was replaced with hydrogen gas twice. Thereafter, the contents of the autoclave were heated at 50° C. in a state pressurized with hydrogen gas up to 3 MPa, and were subjected to a hydrogenation reaction (first stage hydrogenation reaction) for six hours.

Subsequently, the pressure of the autoclave was returned to atmospheric pressure. Furthermore, 25 mg of palladium acetate as a hydrogenation reaction catalyst was dissolved in 60 mL of ion exchanged water to which fourfold molar amount of nitric acid with respect to Pd had been added, and the resulting solution was added. The inside of the system was replaced with hydrogen gas twice. Thereafter, the contents of the autoclave were heated at 50° C. in a state pressurized with hydrogen gas up to 3 MPa, and were subjected to a hydrogenation reaction (second stage hydrogenation reaction) for six hours.

Thereafter, the temperature of the contents was returned to normal temperature, and the inside of the system was changed to a nitrogen atmosphere. Thereafter, the contents were concentrated using an evaporator until the solid content concentration reached 40% to obtain an aqueous dispersion of a copolymer containing an alkylene structural unit and a nitrile group-containing monomer unit. Note that this copolymer had an iodine value of 7 mg/100 mg.

<Preparation of Binder Composition>

To 250 parts of the obtained aqueous dispersion of a copolymer containing an alkylene structural unit and a nitrile group-containing monomer unit, 500 parts of xylene and 2 parts of diisononyl adipate were added, and water was evaporated under reduced pressure to obtain a binder composition including a copolymer containing an alkylene structural unit and a nitrile group-containing monomer unit and an ester compound. Note that the boiling point of diisononyl adipate is 227° C. at 665 hPa, but the boiling point at normal pressure is higher than this temperature.

<Manufacture of Positive Electrode Active Material Layer Slurry Composition>

100 parts of lithium cobaltate (average particle diameter: 11.5 μm) as a positive electrode active material, 150 parts of sulfide glass constituted by $Li_2S$ and $P_2S_5$ ($Li_2S/P_2S_5$=70 mol %/30 mol %, number average particle diameter: 0.4 μm) as solid electrolyte particles, 13 parts of acetylene black as a conductive agent, and 3 parts of a binder composition in terms of a solid content were mixed. Xylene as an organic solvent was further added, and the solid content concentration was adjusted to 78%. Thereafter, the resulting mixture was mixed using a planetary mixer for 60 minutes. Furthermore, the solid content concentration was adjusted to 74% with xylene, and then the resulting mixture was mixed for 10 minutes to prepare a positive electrode active material layer slurry composition.

<Manufacture of Negative Electrode Active Material Layer Slurry Composition>

100 parts of graphite (average particle diameter: 20 μm) as a negative electrode active material, 50 parts of sulfide glass constituted by $Li_2S$ and $P_2S_5$ ($Li_2S/P_2S_5$=70 mol %/30 mol %, number average particle diameter: 0.4 μm) as solid electrolyte particles, and 3 parts of a binder composition in terms of a solid content were mixed. Xylene as an organic solvent was further added, and the solid content concentration was adjusted to 60%. Thereafter, the resulting mixture was mixed using a planetary mixer to prepare a negative electrode active material layer slurry composition.

<Manufacture of Solid Electrolyte Layer Slurry Composition>

100 parts of sulfide glass constituted by $Li_2S$ and $P_2S_5$ ($Li_2S/P_2S_5$=70 mol %/30 mol %, number average particle diameter: 1.2 μm, particle diameter of cumulative 90%: 2.1 μm) as solid electrolyte particles, and 3 parts of a binder composition in terms of a solid content were mixed. Xylene as an organic solvent was further added, and the solid content concentration was adjusted to 30%. Thereafter, the resulting mixture was mixed using a planetary mixer to prepare a solid electrolyte layer slurry composition.

<Manufacture of all-Solid-State Secondary Battery>

The above-described positive electrode active material layer slurry composition was applied onto a surface of a current collector, and the composition was dried (110° C., 20 minutes) to form a positive electrode active material layer having a thickness of 50 μm. A positive electrode was thereby manufactured. The above-described negative electrode active material layer slurry composition was applied onto a surface of another current collector, and the composition was dried (110° C., 20 minutes) to form a negative electrode active material layer having a thickness of 30 μm. A negative electrode was thereby manufactured.

Subsequently, the above-described solid electrolyte layer slurry composition was applied onto a surface of the above-described positive electrode active material layer, the composition was dried (110° C., 10 minutes) to form a solid electrolyte layer having a thickness of 18 μm. A positive electrode for an all-solid-state secondary battery with a solid electrolyte layer was thereby obtained. Flexibility of an electrode body was evaluated using this positive electrode for an all-solid-state secondary battery with a solid electrolyte layer. Table 1 indicates results thereof.

The solid electrolyte layer of the positive electrode for an all-solid-state secondary battery with a solid electrolyte layer and the above-described negative electrode active material layer of the negative electrode were bonded to each other, and were pressed to obtain an all-solid-state secondary battery. The thickness of the solid electrolyte layer of the all-solid-state secondary battery after press was 11 μm. Low temperature output characteristics were evaluated using this battery. Table 1 indicates results thereof.

Example 2

A binder composition was prepared in a similar manner to Example 1 except that tributyl phosphate was used in place of diisononyl adipate. Furthermore, an all-solid-state secondary battery was manufactured in a similar manner to Example 1 except that the obtained binder composition was used. Evaluation was performed in a similar manner to Example 1 using the obtained positive electrode for an all-solid-state secondary battery with a solid electrolyte layer and battery. Table 1 indicates results thereof.

Example 3

A binder composition was prepared in a similar manner to Example 1 except that gamma butyrolactone was used in place of diisononyl adipate. Furthermore, an all-solid-state secondary battery was manufactured in a similar manner to Example 1 except that the obtained binder composition was used. Evaluation was performed in a similar manner to Example 1 using the obtained positive electrode for an all-solid-state secondary battery with a solid electrolyte layer and battery. Table 1 indicates results thereof.

Example 4

A binder composition was prepared in a similar manner to Example 1 except that propylene carbonate was used in place of diisononyl adipate. Furthermore, an all-solid-state secondary battery was manufactured in a similar manner to Example 1 except that the obtained binder composition was used. Evaluation was performed in a similar manner to Example 1 using the obtained positive electrode for an all-solid-state secondary battery with a solid electrolyte layer and battery. Table 1 indicates results thereof.

Comparative Example 1

A binder composition was prepared in a similar manner to Example 1 except that 4,4'-butylidenebis (6-t-butyl-3-methylphenol) was used in place of diisononyl adipate. Furthermore, an all-solid-state secondary battery was manufactured in a similar manner to Example 1 except that the obtained binder composition was used. Evaluation was performed in a similar manner to Example 1 using the obtained positive electrode for an all-solid-state secondary battery with a solid electrolyte layer and battery. Table 1 indicates results thereof.

Comparative Example 2

A binder composition was prepared in a similar manner to Example 1 except that methyl propionate was used in place of diisononyl adipate. Furthermore, an all-solid-state secondary battery was manufactured in a similar manner to Example 1 except that the obtained binder composition was used. Evaluation was performed in a similar manner to Example 1 using the obtained positive electrode for an all-solid-state secondary battery with a solid electrolyte layer and battery. Table 1 indicates results thereof.

Comparative Example 3

A binder composition was prepared in a similar manner to Example 1 except that an adipic acid-based polyester (W-1410-EL manufactured by DIC Corporation) was used in place of diisononyl adipate. Furthermore, an all-solid-state secondary battery was manufactured in a similar manner to Example 1 except that the obtained binder composition was used. Evaluation was performed in a similar manner to Example 1 using the obtained positive electrode for an all-solid-state secondary battery with a solid electrolyte layer and battery. Table 1 indicates results thereof.

Comparative Example 4

A binder composition was prepared in a similar manner to Example 1 except that an aqueous dispersion of hydrogenated SBR (H-SBR) was used in place of the aqueous dispersion of a copolymer containing an alkylene structural unit and a nitrile group-containing monomer unit in the preparation of the binder composition. An all-solid-state secondary battery was manufactured in a similar manner to Example 1 except that the obtained binder composition was used. Evaluation was performed in a similar manner to Example 1 using the obtained positive electrode for an all-solid-state secondary battery with a solid electrolyte layer and battery. Table 1 indicates results thereof.

TABLE 1

| | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Ester compound and/or carbonate compound having boiling point of 100° C. or higher and molecular weight of 550 or less | Kind | Diisononyl adipate | Tributyl phosphate | Gamma butyrolactone | Propylene carbonate | 4,4'-Butylidenebis (6-t-butyl-3-methylphenol) | Methyl propionate | Adipic acid-based polyester (K-1410-EL manufactured by DIC Corporation) | Diisononyl adipate |
| | Boiling point | 227° C. (665 hPa) | 289° C. | 204° C. | 240° C. | Melting point 210° C. | 80 | — | 227° C. (665 hPa) |
| | Molecular weight | 398.6 | 266.3 | 86.1 | 102.1 | 382.6 | 88.1 | about 1,400 | 398.6 |
| | Addition amount | 2 parts | 2 parts | 2 parts | 2 parts | 2 parts | 2 parts | 2 parts | 2 parts |
| Copolymer containing alkylene structural unit and nitrile group-containing monomer unit | Ratio of nitrile group-containing monomer unit | 35% | 35% | 35% | 35% | 35% | 35% | 35% | — (H-SBR) |
| | Iodine value | 7 mg/100 mg | 7 mg/100 mg | 7 mg/100 mg | 7 mg/100 mg | 7 mg/100 mg | 7 mg/100 mg | 7 mg/100 mg | — |
| Evaluation | Flexibility of electrode body | A | B | A | B | C | C | C | D |
| | Low temperature output characteristics | A | A | B | A | D | C | D | D |

As indicated in Table 1, an electrode body manufactured using a binder composition for an all-solid-state battery including a copolymer containing an alkylene structural unit and a nitrile group-containing monomer unit and an ester compound and/or a carbonate compound having a boiling point of 100° C. or higher and a molecular weight of 550 or less had high flexibility. Furthermore, an all-solid-state secondary battery manufactured using this binder composition had excellent low temperature output characteristics.

The invention claimed is:

1. A binder composition for an all-solid-state battery, comprising:
   a copolymer containing an alkylene structural unit and a nitrile group-containing monomer unit; and
   an ester compound and/or a carbonate compound having a boiling point of 100° C. or higher and a molecular weight of 550 or less, and wherein
   the ester compound is at least one selected from an adipate, a phosphate, a trimellitate, and a lactone.

2. The binder composition for an all-solid-state battery according to claim 1, wherein a content ratio of the nitrile group-containing monomer unit in the copolymer containing an alkylene structural unit and a nitrile group-containing monomer unit is 10% by mass or more and 55% by mass or less.

3. The binder composition for an all-solid-state battery according to claim 1, wherein the copolymer containing an alkylene structural unit and a nitrile group-containing monomer unit has an iodine value of 3 mg/100 mg or more and 30 mg/100 mg or less.

4. The binder composition for an all-solid-state battery according to claim 1, wherein the carbonate compound is a cyclic carbonate.

5. The binder composition for an all-solid-state battery according to claim 1, wherein the carbonate compound is at least one selected from an ethylene carbonate, a propylene carbonate, or a butylene carbonate.

* * * * *